Aug. 16, 1932.  E. F. ROSSMAN  1,871,861

OSCILLATING JOINT

Filed Aug. 15, 1929

Inventor
Edwin F. Rossman
By Spencer Hardman & Fehr
His Attorneys

Patented Aug. 16, 1932

1,871,861

UNITED STATES PATENT OFFICE

EDWIN F. ROSSMAN, OF DAYTON, OHIO, ASSIGNOR TO DELCO PRODUCTS CORPORATION, OF DAYTON, OHIO, A CORPORATION OF DELAWARE

OSCILLATING JOINT

Application filed August 15, 1929. Serial No. 386,193.

This invention relates to oscillating pivot joints which permit also a slight universal movement between the parts connected thereby.

An object of this invention is to provide such a joint wherein the two connected parts are isolated from each other by a resilient non-metallic material such as soft rubber, which resilient material provides for a limited universal movement between the connected parts by distortion thereof.

Another object is to provide such a joint which is efficient and long-lasting in use and is very simply and economically made.

A more specific object is to provide such a pivot joint wherein the journal pin has an axially concave bearing surface and a corresponding relatively thin metallic bearing sleeve fitting snugly thereupon, whereby to prevent axial sliding of said bearing sleeve upon said pin.

Further objects and advantages of the present invention will be apparent from the following description, reference being had to the accompanying drawing, wherein a preferred embodiment of one form of the present invention is clearly shown.

In the drawing.

Similar reference characters refer to similar parts throughout the several views.

Figures 1, 2, 3:
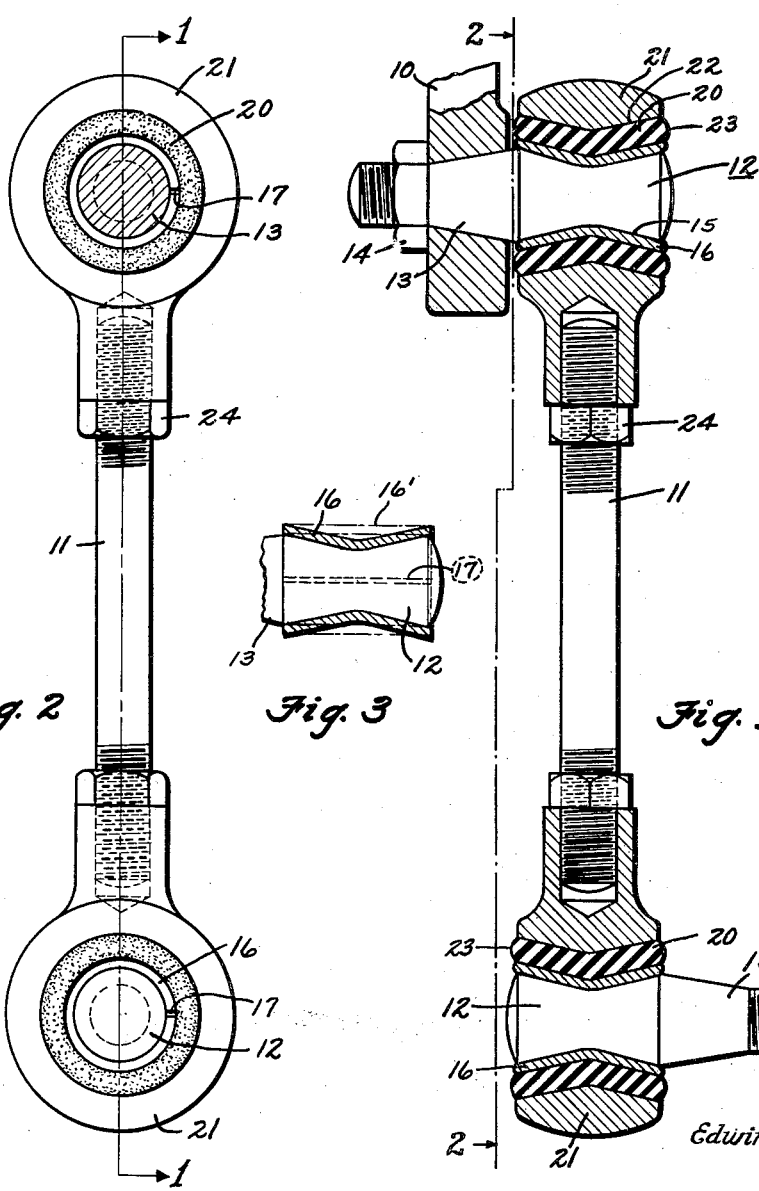
Fig. 1 is a sectional view, on line 1—1 of Fig. 2, through two oscillating pivot joints connecting a rigid thrust link with a swinging lever and a pivot pin at the lower end thereof. Such mechanism may be used to connect the lever arm of a hydraulic shock absorber as used on present day automobiles to the lower pivot pin which is fixed to the car axle.
Fig. 2 is a side elevation taken on line 2—2 of Fig. 1.
Fig. 3 is a detail view showing a method of forming a metallic bearing sleeve upon the axially concave bearing pin.

Numeral 10 designates the lever arm which actuates the piston or pistons of a hydraulic shock absorber used on present day automobiles to control the main leaf springs. This arm 10 is actuated by the thrust link 11 which is connected thereto by an oscillating pivot joint made according to this invention. Pivot pin 12 is rigidly fixed to the outer end of lever arm 10 by any suitable means such as the tapered shank 13 and nut 14 illustrated. Pin 12 has an axially concave bearing surface 15, that is, its central diameter is less than its end diameters. Preferably the form is a simple double conical surface as illustrated. A relatively thin metallic bearing sleeve 16, preferably formed from a self-lubricating material, fits snugly over the concave bearing surface 15 with a preferably snug sliding fit thereupon. Preferably sleeve 16 has an axial slit 17 therein so that it is slightly collapsible under pressure whereby to insure that it maintains a snug fit upon surface 15 after a period of use. Bearing sleeve 16 is preferably formed up from flat grapho-bronze material, which is a bearing bronze having a large number of small recesses in its bearing surface and a graphite material filling said small recesses. This material is now readily available on the market. Any other suitable thin bearing material may be used if desired. Fig. 3 illustrates in dot and dash lines a cylindrical sleeve 16' first formed from the grapho-bronze flat stock. This cylindrical sleeve 16' is slipped over the finished bearing pin 12 and is then deformed by any suitable means, such as by rolling dies or by pressure dies, so that it is properly shaped down to conform with the axially concave bearing surface 15 of pin 12, as shown in full lines at 16 in Fig. 3. This shaped sleeve 16 is thus permanently assembled upon the pin 12 and cannot slide axially therefrom. A resilient bushing 20, preferably of soft rubber, is slipped over the sleeve 16 while assembled upon pin 12 and then this assembly is forced tightly into the eye member 21. The eye member 21 preferably has the eye aperture 22 double-flared to correspond approximately to the shape of bearing sleeve 16, however of substantially larger diameter both at the central and end portions of said aperture. The thickness of wall of the rubber bushing 20 is such that when the parts are assembled in place, as shown in Fig. 2, the rubber material will be compressed and by such compression will be axially extended, causing it to bulge out slightly at the unconfined ends 23. Eye member 21 is rigidly fixed to the link 11 by suitable means, such as by screw threads and the nut 24.

In operation, the eye member 21 pivots easily upon the pivot pin 12 and is entirely isolated therefrom by the resilient bushing 20. Preferably bushing 20 is under such compression that it maintains a non-slipping bond both with the walls of aperture 22 and with the outer surface of sleeve 16. All surface sliding will, therefore, occur between the self-lubricating sleeve 16 and the pin 12 and hence no greasing or oiling of the joint is required. The slit 17 in sleeve 16 permits said sleeve to always fit snugly upon pin 12 and so prevent looseness and rattle. A small lateral swing of link 11 relative to arm 10 is permitted by the yieldability of the resilient bushing 20 without metallic contact between parts 10 and 21, as will be clear from viewing Fig. 1. When this mechanism is used with automobile shock absorbers as herein described, such limited lateral swinging will occur due to the relative lateral movement or "side sway" of the chassis frame to the axle.

The pivot joint connecting the lower end of link 11 to the car axle has been shown in the drawing as a duplicate of the upper joint between link 11 and lever arm 10, however any other suitable form of joint may be used at the lower connection. It is to be understood that the tapered shank 13 of the lower pivot pin 12 is rigidly fixed to the car axle or to a fitting rigid therewith. Since the angular amplitude of this lower oscillating joint is ordinarily very much smaller than that of the upper joint, in some cases it is desirable to omit the bearing sleeve 16 entirely in the lower joint and let a somewhat thicker wall resilient rubber bushing 20 contact directly with the pivot pin 12 in a substantially non-slipping relation therewith. The angular oscillations between the eye 21 and pin 12 will then be taken by an internal twisting distortion of the bushing 20 without any slipping of the rubber bushing upon its contacting metal walls and hence there will be little or no wear upon the rubber.

It is obvious that with this invention, the oscillating joints together with the pivot pins 12 are first assembled upon the link 11, and then the projecting ends of pins 12 are attached to the arm 10 and the car axle. This provides a very easy and simple method of assembling the parts upon the automobile chassis.

While the form of embodiment of the present invention as herein disclosed, constitutes a preferred form, it is to be understood that other forms might be adopted, all coming within the scope of the claims which follow.

What is claimed is as follows:

1. A pivot joint connecting two relatively movable parts, comprising: a pivot journal fixed to one of said parts and having a double tapered bearing surface with the smaller diameter at its central portion, a metallic bearing sleeve rotatably mounted thereupon and permanently shaped to conform to said double-tapered bearing surface to prevent axial sliding thereupon, a resilient bushing surrounding said bearing sleeve and compressed in non-slipping contact thereupon, and an eye enclosing said resilient bushing under compression and fixed to the other of said movable parts.

2. A pivot joint connecting two relatively movable parts, comprising: a pivot journal fixed to one of said parts and having an axially concave bearing surface, a metallic bearing sleeve permanently deformed upon said journal pin so as to conform with said concave bearing surface and be capable of rotation only thereupon, a resilient bushing surrounding said bearing sleeve, and an eye member surrounding said resilient bushing and rigid with the other of said two movable parts, said resilient bushing being held in substantially non-slipping contact with said bearing sleeve and eye member.

3. A pivot joint connecting two relatively movable parts, comprising: a pivot journal fixed to one of said parts and having an axially concave bearing surface, a relatively thin wall metallic bearing sleeve substantially conforming with and fitting snugly but rotatably upon said axially concave bearing surface, a relatively thick resilient bushing surrounding said bearing sleeve, and an eye member enclosing said resilient bushing under high radial compression and rigid with the other of said movable parts.

4. A pivot joint connecting two relatively movable parts comprising: a pivot journal fixed to one of said parts and having an axially concave bearing surface, a split metal bushing sliding rotatably thereupon and shaped to conform to said concave bearing surface to prevent relative axial sliding, a non-metallic resilient bushing surrounding and compressing said split bushing upon said journal, and an eye enclosing said resilient bushing under compression and fixed to the other of said movable parts.

In testimony whereof I hereto affix my signature.

EDWIN F. ROSSMAN.